C. R. Rand.
Trunk.
N° 89,503. Patented Apr. 27, 1869.
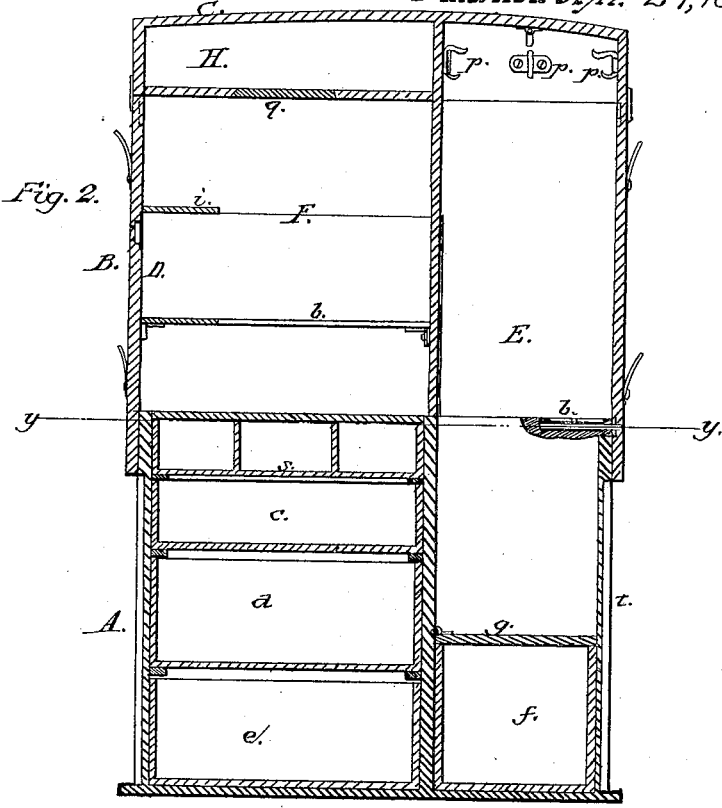
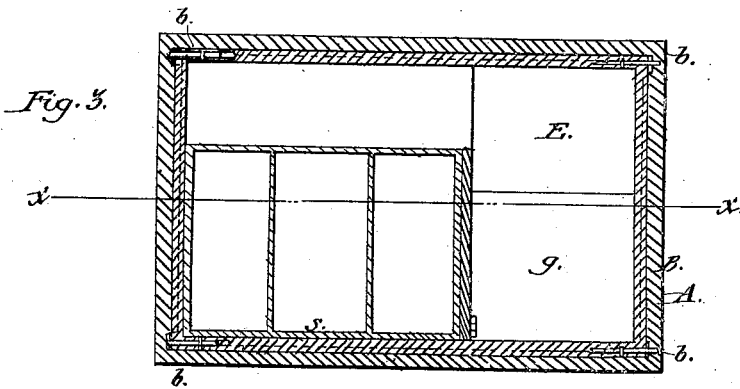
Witnesses:
P. T. Dodge
L. Hailer
Inventor:
C. R. Rand
per Dodge & Munn
Attorney

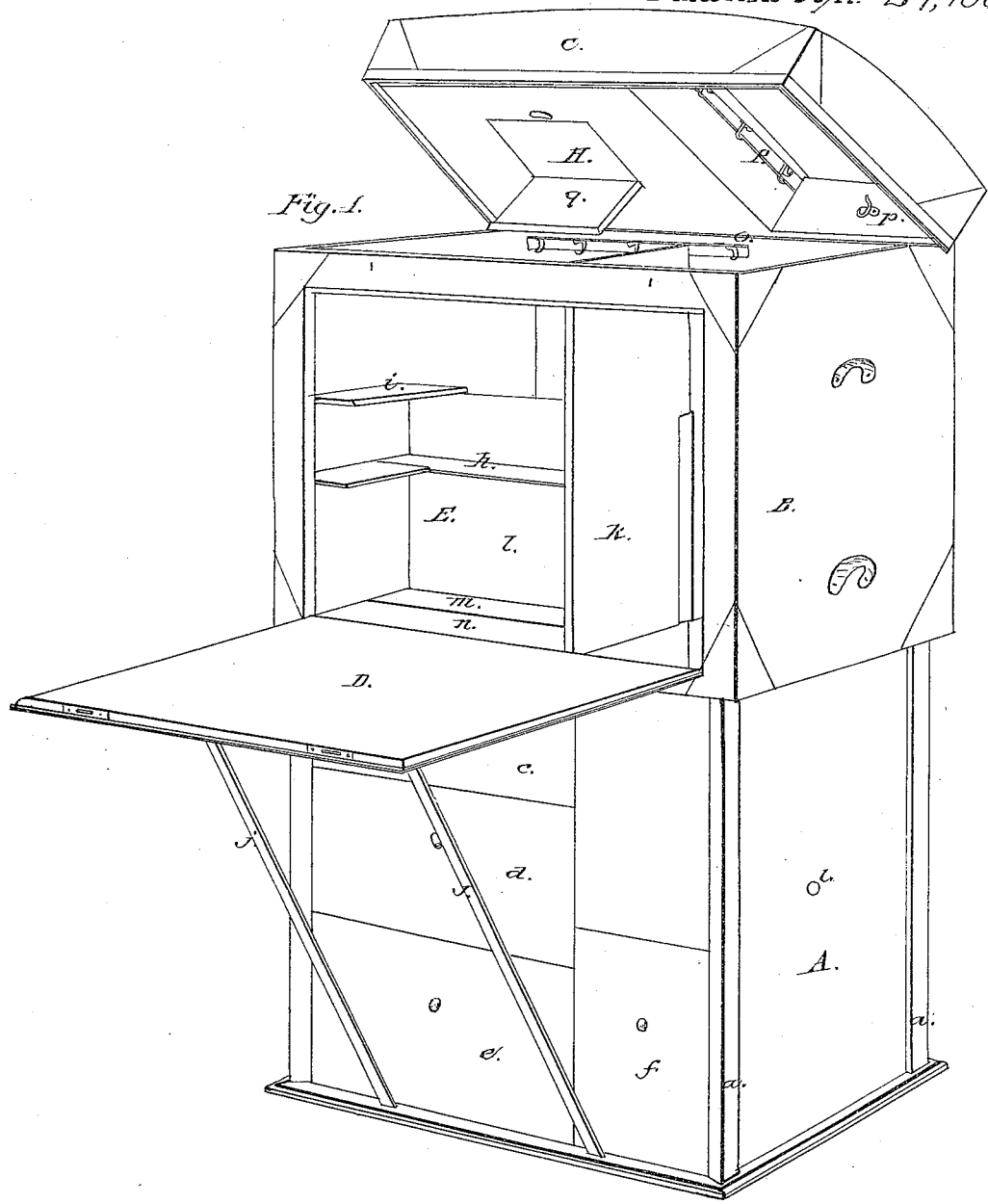

C. R. RAND, OF DUBUQUE, IOWA.

Letters Patent No. 89,503, dated April 27, 1869.

---

IMPROVEMENT IN TRUNKS.

---

The Schedule referred to in these Letters Patent and making part of the same.

---

*To all whom it may concern:*

Be it known that I, C. R. RAND, of Dubuque, in the county of Dubuque, and State of Iowa, have invented certain new and useful Improvements in Combined Bureau and Wardrobe-Trunks; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to bureau-trunks, and consists in a novel combination of a trunk with a bureau, so that they may be closed up within the limits of an ordinary trunk, or extended, so as to form a combined, bureau, wardrobe, and writing-desk, and book-case.

Figure 1 is a perspective view of my combined trunk and bureau, extended.

Figure 2, a vertical section of the same on the line $x\,x$ of fig. 3.

Figure 3, a horizontal section on the line $y\,y$ of fig. 2.

I construct a rectangular body, or bureau, of any desired size, and provide it with the projecting corner-pieces $a$, and the drawers $c\,d\,e$, and tray $s$, as shown in figs. 1, 2, and 3.

Over and around this body A, I place a shell, B, of the shape of a common trunk, and provide it with a hinged top, C, and hinged front, D.

This shell B is of the requisite size to fit snugly about corner-pieces $a$, of the body A, and in such a manner that it may be shoved down over and completely enclose it, and thus give to the whole the appearance of a trunk, leaving a space between the walls of the body and the shell, equal to the thickness of the corner-pieces $a$.

The shell is locked in place on the body by bolts, $b$, on the upper corners of the body, as shown in figs. 2 and 3.

After releasing the bolts $b$, the shell may be lifted up, high enough for its lower edges to close over the top of the body, and may be secured in that position, by shoving out the bolts $b$, which enter holes in the shell, made for the purpose.

When in this position, it forms a tall case, or wardrobe, as shown in figs. 1 and 2.

In one end of the top C, I form a compartment, H, to contain articles of clothing, &c., and provide it with a door, $q$, the latter being shown partially open in fig. 1.

In the opposite end of the top, I attach a series of clothes-hooks, $p$, upon which to hang articles of dress.

A portion of the space below these hooks extends to the floor, as partially shown in the same figure.

Along on the back side of the shell, I locate a detachable bar, $o$, also provided with clothes-hooks, for hats and other articles.

The drawers $c$, $d$, and $e$ may be used for clothes and miscellaneous articles, and the drawer $f$ for a hat or bonnet-box.

Access may be had to the drawer $f$ through the front, or by raising the hinged lid $g$, shown in figs. 2 and 3.

When a writing-desk is desired, the side D is turned down, and supported by the braces $j$, which are placed under it.

Inside of the shell I erect the partitions $k$ and $l$, dividing off an apartment, F, in which I place shelves, $h$ and $i$, for books.

The tray $s$ I divide into three divisions, which, when the apparatus is closed, may be used for toilet-articles, writing-materials, miscellaneous tools, &c.

On top of this tray $s$, I lay boards, $m$ and $n$, so as to form a smooth floor for a chamber, F, which forms a convenient and ornamental receptacle for writing-materials, books, business-papers, &c., and may be closed by simply turning up and locking the door D.

When my combined trunk and bureau is to be closed for transportation, the partitions $k$ and $l$, shelves $h$ and $i$, and boards $m$ and $n$, are removed from the interior, and placed around against the outside of the body A, and after removing the bar $o$, the bolts $b$ are unfastened, and the shell shoved down and fastened, and the partitions, shelves, &c., in the space between the body and the shell, are thus compactly stored, and out of sight, where they cannot be lost or injured.

The braces $j$ and bar $o$ are placed inside of the trunk.

The various drawers, the lid, and the door D, I provide with suitable locks, or other fastening-devices, and protect the shell either with battens and metal corners, or by giving it an entire sheathing of zinc, and also veneer, varnish, or otherwise finish the body A, to give it an ornamental appearance.

When desired, the body may be provided with detachable casters, which can be removed, when necessary for any purpose, and placed inside.

A trunk of this construction will be found of great service to travellers and business-men.

Besides being a very ornamental piece of furniture, it can be transported from place to place, answering all the purposes of a trunk, and, when desired, can be set up for the purposes described.

Having thus described my invention,

What I claim, is—

1. A trunk, consisting of an outer shell, B, with a hinged front, D, arranged to slide vertically on a bureau-body, A, so as to be extended and held by bolts $b$, substantially as herein described, for the purpose of being converted into a wardrobe, book-case, and writing-desk, as set forth.

2. In combination with the outer shell B and the bureau-body A, the corner-pieces $a$, and bolts $b$, or their equivalents, when constructed and arranged substantially as described, and for the purpose set forth.

3. The combination of the cover C, having a compartment provided with hooks, $p$, with the sliding shell B, having bar $o$, provided with hooks, and arranged to receive removable shelves and partitions, as herein described, and for the purpose set forth.

4. The bureau-body A, with drawers $c\ d\ e$, till $s$, and drawer $f$, with hinged cover, in combination with the outer shell B, provided with partitions, shelves, and hooks, constructed and arranged as described.

C. R. RAND.

Witnesses:
FRANK M. ROBINSON,
AUSTIN ADAM.